(12) United States Patent
Macias

(10) Patent No.: US 12,376,506 B2
(45) Date of Patent: Aug. 5, 2025

(54) DEBRIS HANDLING SHOVEL ATTACHMENT

(71) Applicant: Job Macias, San Antonio, TX (US)

(72) Inventor: Job Macias, San Antonio, TX (US)

(*) Notice: Subject to any disclaimer, the term of this patent is extended or adjusted under 35 U.S.C. 154(b) by 708 days.

(21) Appl. No.: 17/569,072

(22) Filed: Jan. 5, 2022

(65) Prior Publication Data

US 2022/0210960 A1    Jul. 7, 2022

Related U.S. Application Data

(60) Provisional application No. 63/134,272, filed on Jan. 6, 2021.

(51) Int. Cl.
*A01B 1/02* (2006.01)

(52) U.S. Cl.
CPC .................................. *A01B 1/022* (2013.01)

(58) Field of Classification Search
CPC .. A01B 1/022; A01B 1/18; A01B 1/20; A01D 7/10; A01G 20/43; E01H 5/02
USPC ........................................................ 294/50.9
See application file for complete search history.

(56) References Cited

U.S. PATENT DOCUMENTS

| | | | |
|---|---|---|---|
| 391,078 A * | 10/1888 | Rieohen | |
| 984,761 A * | 2/1911 | Green | A01B 1/18 294/50.9 |
| 1,082,547 A * | 12/1913 | Nuttall | A01B 1/18 294/50.9 |
| 1,407,232 A * | 2/1922 | Stevens | A01B 1/18 294/50.5 |
| 1,860,963 A * | 5/1932 | Thomas | A01B 1/18 294/50.5 |
| 1,908,322 A * | 5/1933 | Cook | A01B 1/18 D8/4 |
| 2,315,831 A * | 4/1943 | Wilcox | A62C 3/06 294/51 |
| 3,369,834 A * | 2/1968 | Miles | A01C 5/02 294/50.9 |
| 5,881,545 A * | 3/1999 | Wilson | A01B 1/20 294/50.9 |
| 5,918,920 A * | 7/1999 | Tamburro, Sr. | A01B 1/022 294/51 |
| 6,250,697 B1 * | 6/2001 | Clugston | A01D 7/10 294/50.9 |
| 6,367,236 B1 * | 4/2002 | Marcone | A01B 1/02 56/400.12 |
| 6,467,377 B1 * | 10/2002 | Kersting | E04G 23/006 81/45 |
| 6,619,023 B1 * | 9/2003 | Marcone | A01D 7/10 294/50.6 |
| 8,087,707 B1 * | 1/2012 | Hawkins | A47G 25/82 223/111 |

(Continued)

FOREIGN PATENT DOCUMENTS

GB          1166523 A  * 10/1969

*Primary Examiner* — Paul T Chin

(74) *Attorney, Agent, or Firm* — Brandon Cook; Gunn, Lee & Cave, PC

(57) ABSTRACT

A debris handling shovel or shovel attaching with a trapping member and a triggering device. The triggering device actuates the trapping member to secure debris collected in the head or scoop of the shovel. The trigger device releases the debris when desired. The triggering device is positioned to be easily operatable by a person holding the shovel in a standard grip.

5 Claims, 7 Drawing Sheets

(56) References Cited

U.S. PATENT DOCUMENTS 8,641,111 B2 * 2/2014 Lee .................. A01G 20/43
  294/58
10,091,953 B1 * 10/2018 Stagner .............. A01G 20/43

* cited by examiner

DEBRIS HANDLING SHOVEL ATTACHMENT

CROSS-REFERENCES TO RELATED APPLICATIONS

This application claims the benefit of provisional patent application No. 63/134,272 filed Jan. 6, 2021.

STATEMENT REGARDING FEDERALLY SPONSORED RESEARCH OR DEVELOPMENT

Not applicable.

BACKGROUND OF THE INVENTION

1. Field of the Invention

The present invention relates to the field of general construction and home cleaning tools. Specifically, the present invention relates to a shovel type tool for cleaning and collecting debris on the ground or floor.

When it comes to home and construction clean up there are circumstances where the debris is too awkward or voluminous to clean and collect effectively by hand or with currently available tools. Some examples are tree leaves or construction debris such as broken gypsum board or fiber glass batts that can easily be blown away with air movement. Currently the most common tool used is a scoop shovel or a large dustpan. Both tools used have a disadvantage which require the user to bend over and hold the debris with one hand and either the shovel handle or the dustpan handle with the other, causing extraneous effort on behalf of the user. There is a need in the industry for the development of an efficient tool for collecting awkward to handle debris.

SUMMARY OF THE INVENTION

An object of the present invention is to provide a tool for collecting difficult to handle debris, which will simplify and expedite the collection and disposal of debris. Another object of the invention is to provide an attachment mechanism for attaching tools to different types of shovels, such as but not limited to, scoop, snow, and spade shovels. The present invention can convert shovels into a specialized tools for the collection and disposal of any awkward to handle debris including but not limited to construction and garden debris.

Another function of the attachment is that it can be used to collect and transfer debris straight to the disposal container without the need for a dust pan or similar type device.

DETAILED DESCRIPTION

Figure 1:
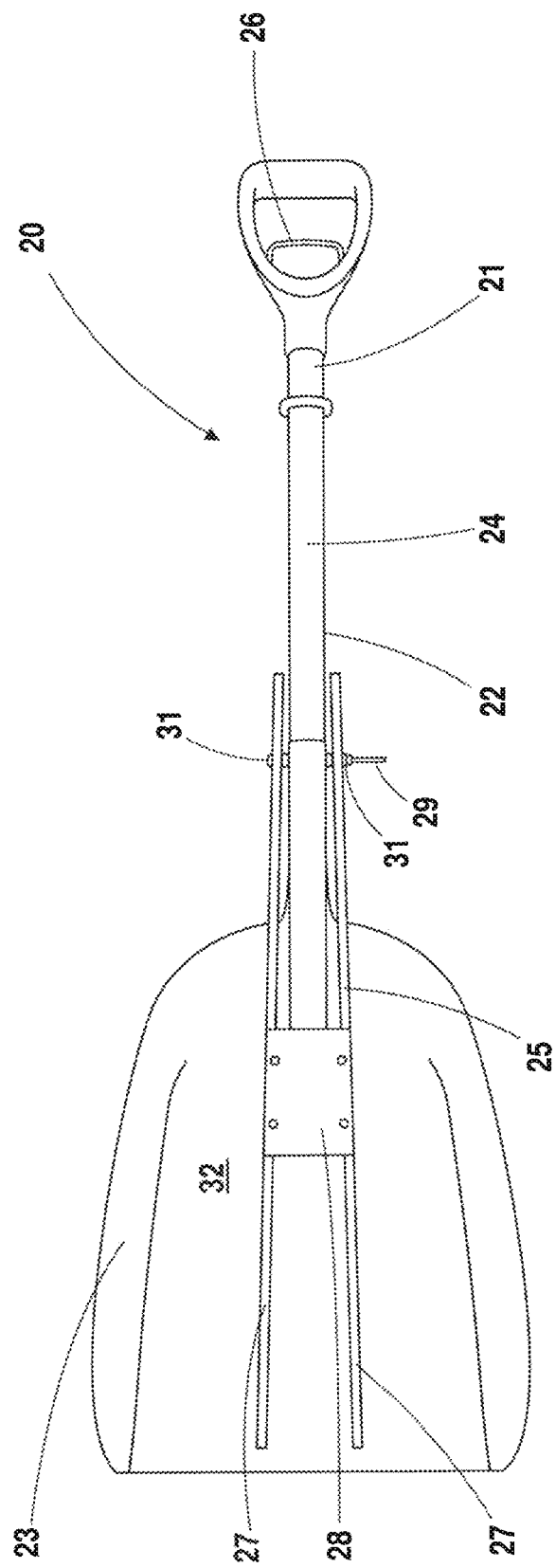
FIG. 1 is front view of a first embodiment of the debris handling device.
Figure 2:
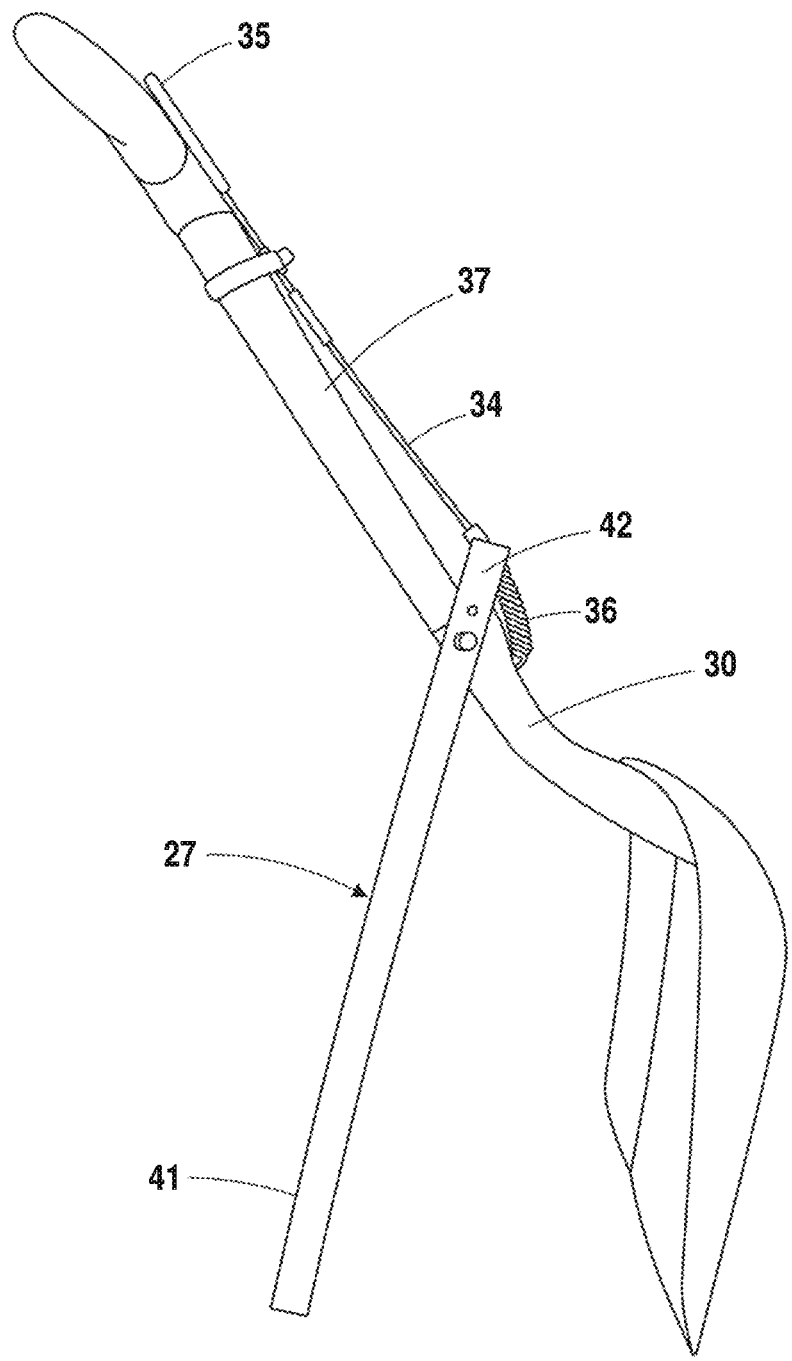
FIG. 2 is a side view of the first embodiment of the debris handling device with trapping mechanism in the open position.

Referring to FIG. 1, a first embodiment 20 of the debris handling device comprises a shovel 21 and a debris attachment 22. The shovel 21 comprises a shovel head 23 for collecting debris and a shovel handle 24 extending therefrom. In the embodiment of the invention shown in the figures, the debris handling tool 20 is implemented with a scoop shovel.

The debris attachment 22 comprises a pivoting trapping member (or arm) 25 to hold debris in shovel head 23. The trapping member 25 can be an aluminum extruded thumb or a rake style hand, or any other suitable shape or configuration capable of clamping debris into the head of the shovel. In the embodiment shown in the Figures, the trapping member 25 comprises two elongated fingers 27 and a trapezoid shaped plate 28. The plate 28 is attached to the fingers 27 via bolts.

Figure 3:
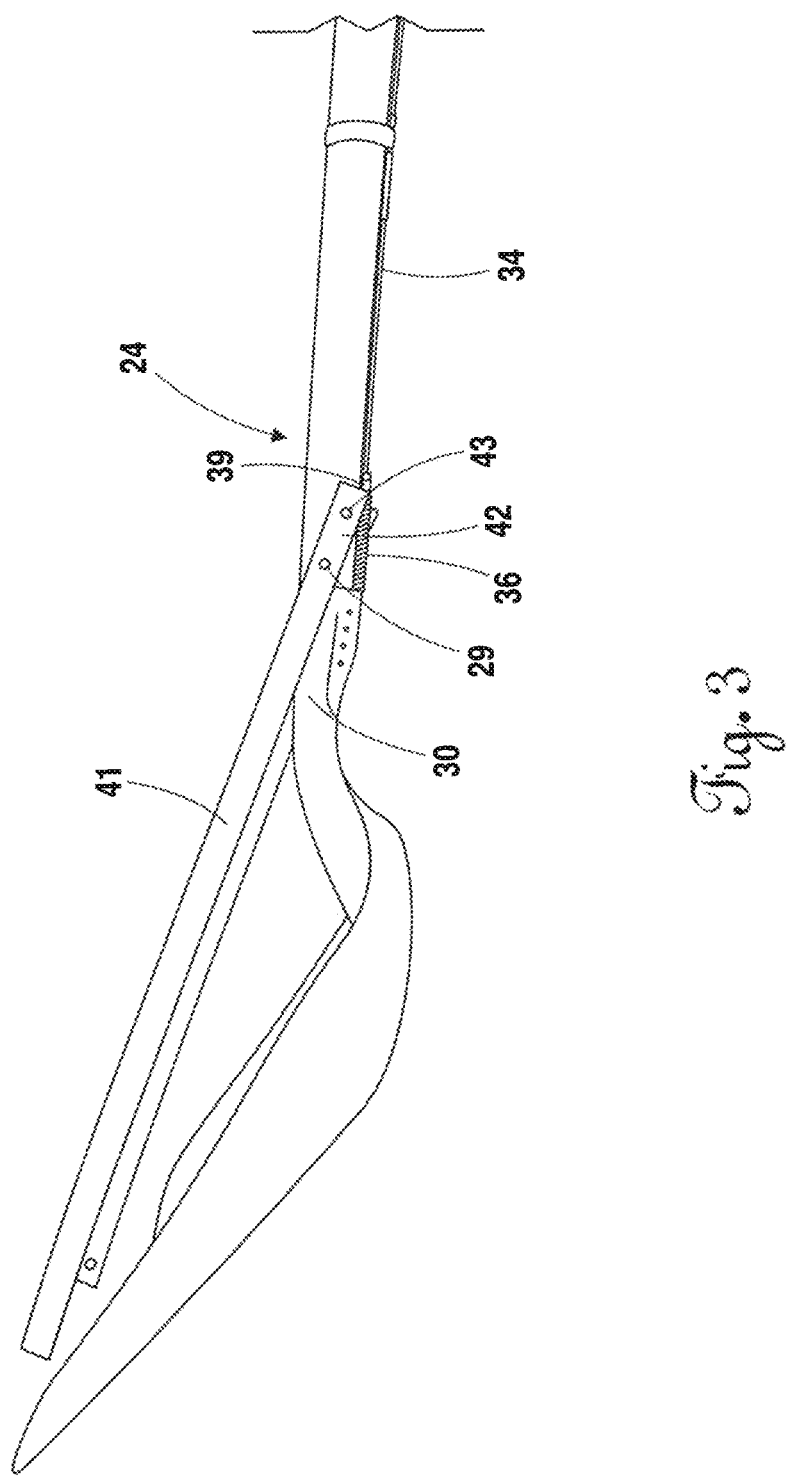
FIG. 3 is a partial side view of the first embodiment of the debris handling device with the trapping mechanism in the closed position.
Figure 4:
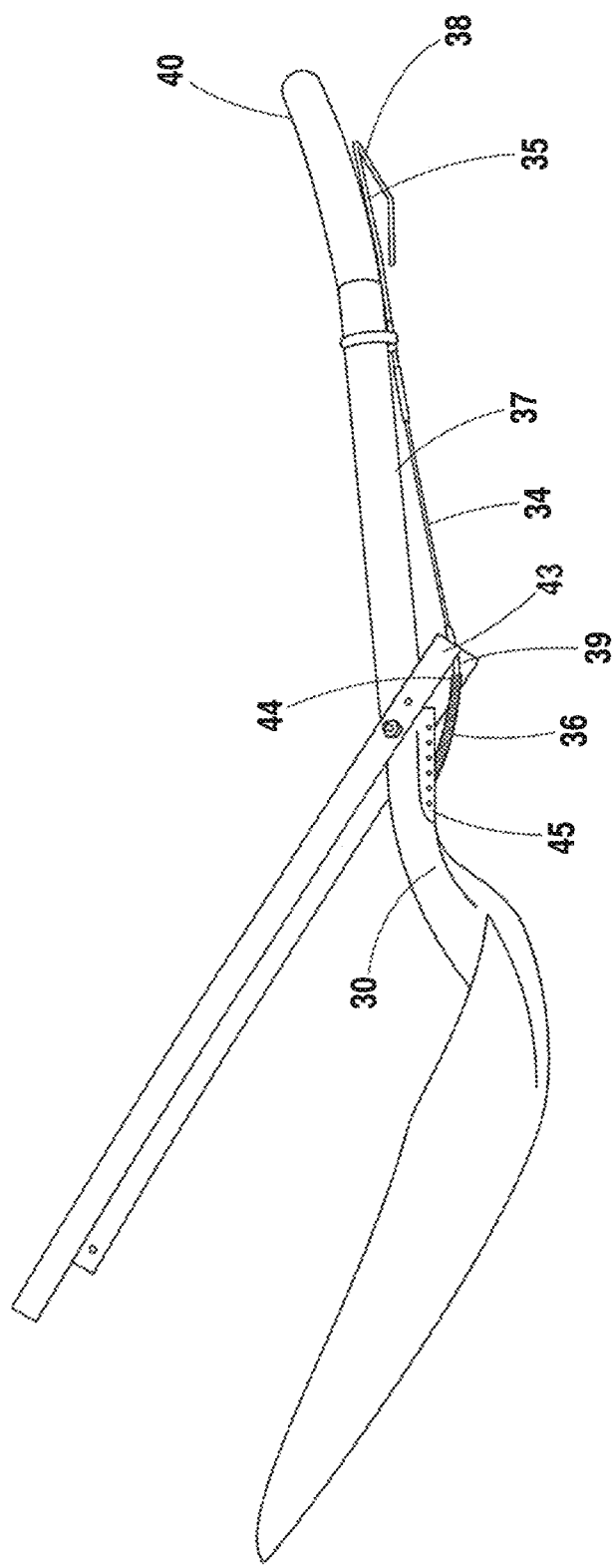
FIG. 4 is a side view of the first embodiment of the debris handing device with the trapping mechanism in the open position.
Figure 5:
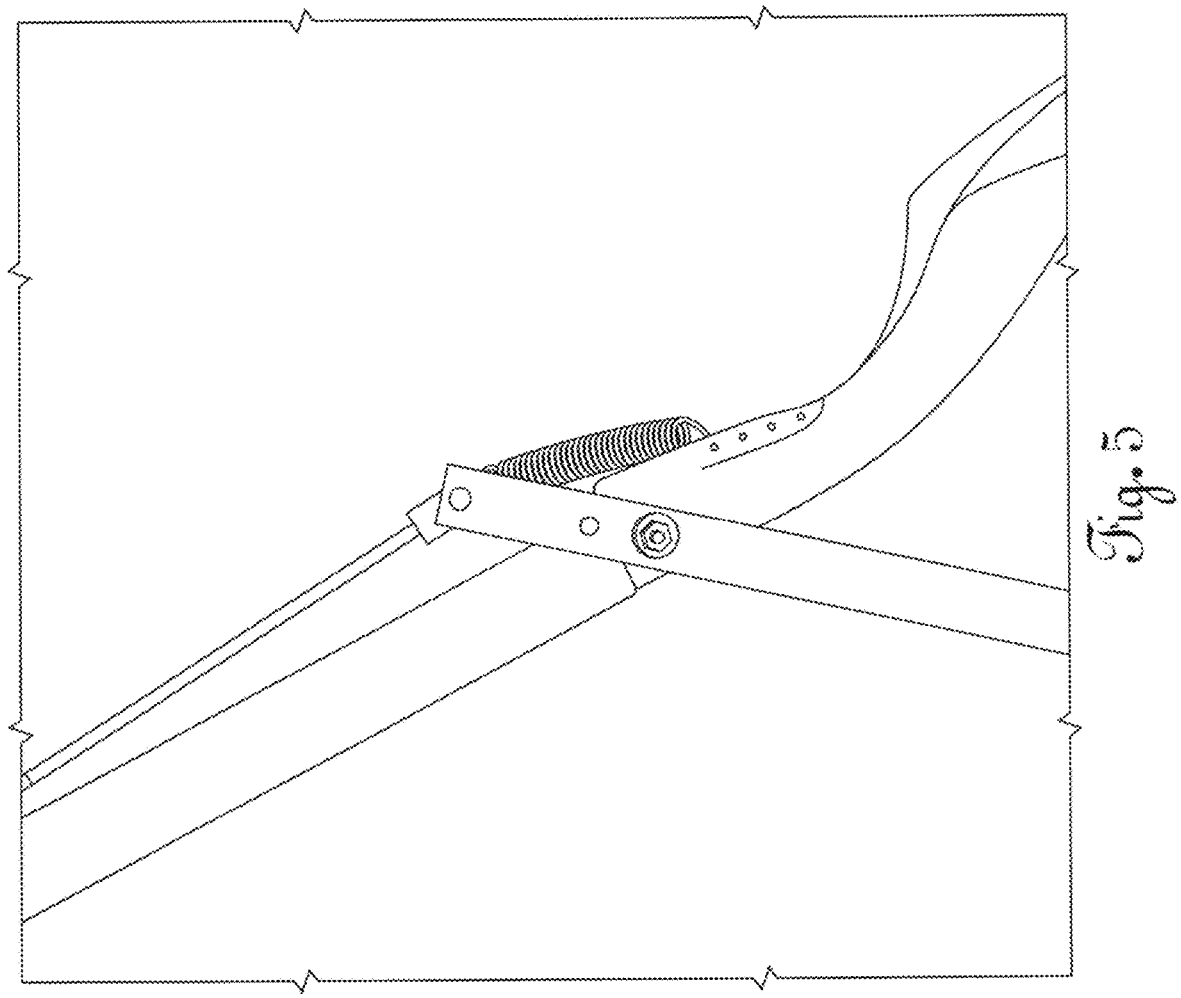
FIG. 5 is a blown-up view of the first embodiment of the debris handing device showing the attachment of the trapping mechanism to the shovel.
Figure 6:
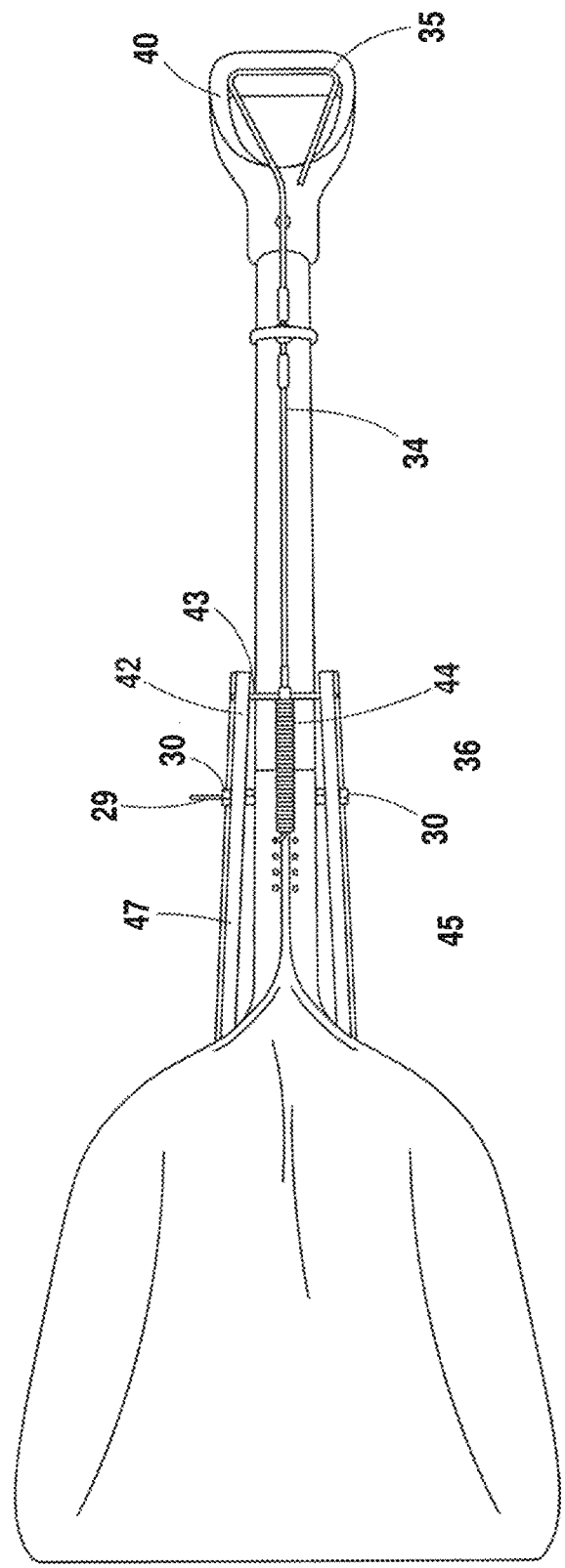
FIG. 6 is a rear view of the first embodiment of the debris handling device.
Figure 7:
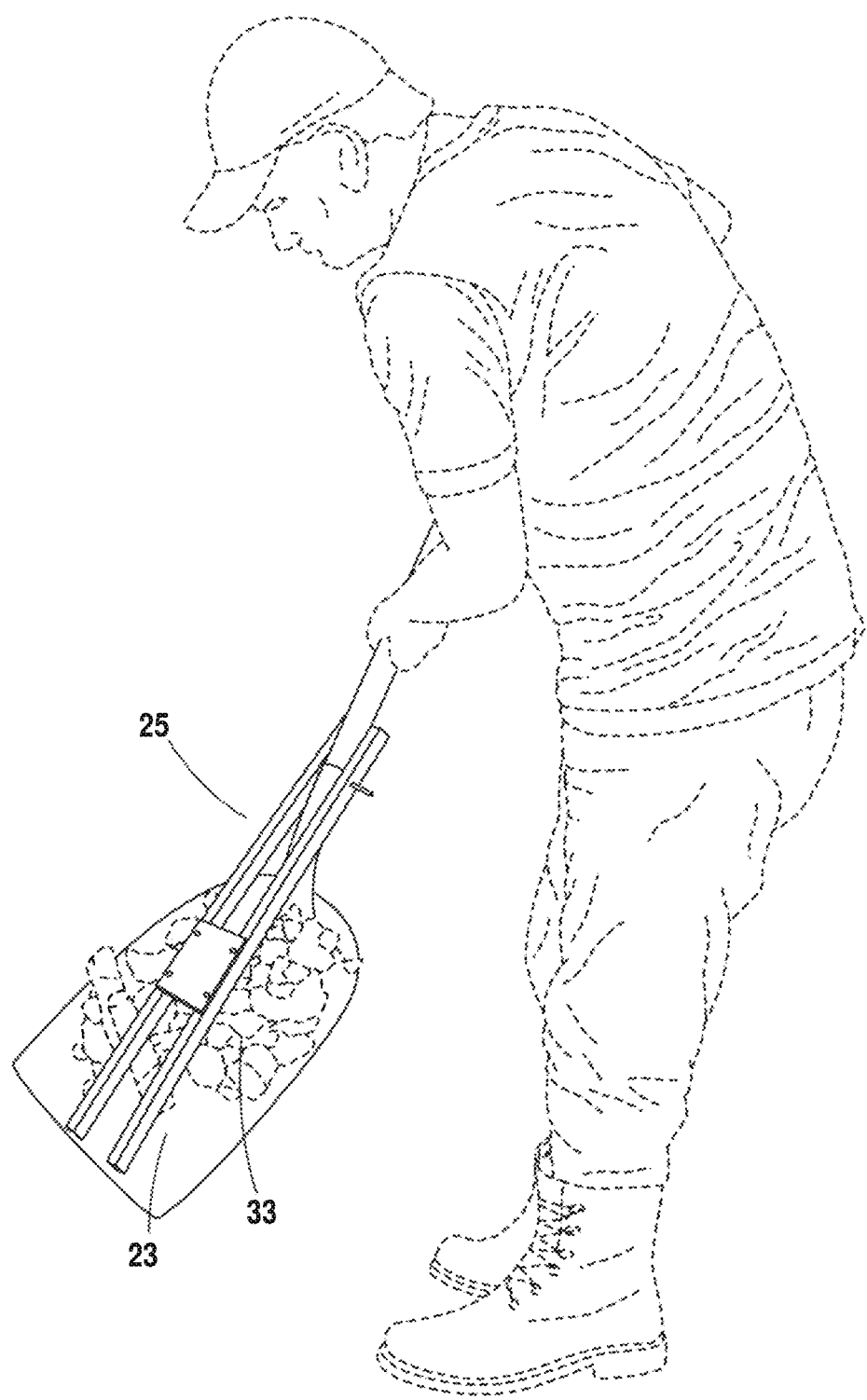
FIG. 7 a perspective view of the debris handling device being used by a user to collect and hold debris.

Referring to FIG. 3, the fingers 27 comprise a trapping portion 41 and an opposing attachment portion 42. The trapping portions 41 extend over an open side 32 the shovel head 23. The attachment portions 42 extend out from an underside 37 of the shovel handle 24.

Persons of skill in the art understand the trapping member 25 could have more fingers and/or different shaped fingers. For example, the trapping member 25 could have five fingers configured like a human hand or be configured like a rake head. The trapping member 25 could be a polymer, metal, or composite. Suitable materials for the trapping member 25 include, but are not limited to polymers such as nylon and abs, metals such as steel and aluminum or composites such as fiber glass or carbon fiber.

The trapping member 25 is pivotably attached to the shovel handle 24 via a bolt 29 and nuts 31. A cylindrical aperture (not shown) is drilled through the shovel handle 24 and/or the shovel head 23 at the desired location for the attachment. The bolt 29 separates the trapping portions 41 of the fingers 27 from the attachment portions 42 of the fingers 27.

In the embodiment shown in the figures, the trapping member 25 is bolted to the shovel handle 24 near where the neck 30 of the shovel head 23 surrounds the shovel handle 24. However, persons of skill in the art understand that the trapping member 25 could be pivotally bolted at other locations along the shovel handle 24. The trapping member 25 is positioned so that it is located on the open side of the shovel head 32. In other embodiments, the trapping member could be integrally constructed onto the shovel.

The debris attachment 22 further comprises a trigger 26 used to open and close the trapping member 25. The trigger comprises a rod 34, a lever 35, and a spring 36.

The rod 34 is attached to the underside 37 of the shovel handle 24. The rod 34 has a first end 38 and a second end 39.

The first end 38 of the rod 34 is proximate the hand grip 40 of the shovel handle 24. The first end 39 of the rod 34 is connected to the lever 35. The lever 35 can be integral the rod 34, or a separate piece attached to the rod 34 via suitable means. In the embodiment shown in the figures, the lever 35 is located on the underside 37 of the shovel handle 24 parallel with the handle 24. The lever 35 is near the hand grip 40 of the shovel handle 24, so that the lever 35 can be reached while a user has his or hands positioned for conventional use of the shovel 21.

The second end 39 of the rod 34 is proximate to the shovel head 23. The second end 39 of the rod 34 is connected to the trapping member 25 via the attachment portions 42 of the fingers 27. A second bolt 43, or other suitable means, connects the second end 39 of the rod 34 to the attachment portions 42 of the fingers 27.

The spring 36 has a first end 44 and a second end 45. The first end of the spring 44 is connected to the second end of the rod 34 and the second bolt 43. The second end of the spring 44 is connected to the shovel 21, via the neck of the 30 of the shovel head 23. The trapping arm 25 has a return spring 36 which returns the trapping arm 25 to the open position when the user releases the lever 35. The return spring 36 applies force to maintain the trapping arm 25 open. The spring 36 can also be made of but not limited to a polymer compound such as rubber or any other metal or plastic or organic composition.

Operation of the debris handling device is described with reference to FIGS. 1-9. The user grips the debris handling device 20 as he or she would grip a conventional shovel. The user opens the trapping member 25 by actuating the trigger 26. The trigger 26 is actuated by pushing or pulling on the lever 35. Pushing the lever 35 towards the shovel head 23 displaces the rod 34 towards the shovel head 23 end of the shovel 21. The downward movement of the rod 34 pushes on the second bolt 43 away from the underside 37 of the shovel handle 24 causing the trapping member 25 to pivot away from the shovel head 23 and into the open position 46.

When the user desires to close the trapping member 25, the user pulls the lever 35 towards the hand grip 40 end of the shovel 21. The movement of the rod 35 towards the hand grip 40 pulls second bolt 43 towards the underside 37 of the shovel handle 24 causing the trapping member 25 to pivot into the closed position 47.

While the debris handling device 20 is in the open position 46, the user can collect debris 33 within the open side 32 of the shovel head 24. The user can then clamp debris in the shovel head 23 by pulling the lever 35 which clamps the trapping arm 25 onto to the debris, securing the debris 33.

Other means of actuating the pivoting arm include, but are not limited to, electric actuators, hydraulic actuators, and mechanical linkages such as rods or cables. Other embodiments of the invention use other types of actuators, such as cable or electric solenoids. The range of the arm from open to close from 0 degrees form the shovel head up to but not limited to 180-degree sweep.

The uniqueness and novelty of the tool is that the user will handle a shovel as they normally would there will be nothing new to learn in regards to the mechanics of using a shovel. Hands will be placed where they normally would during normal use of a shovel such as in FIG. 7. The key being that the lever will actuate the arm therefore is no different than squeezing a lever. Other products have multiple handles and other ways of holding debris. Which require two hands to actuate the clamping mechanism which will lessen the ability of the user to carry more debris and be less agile with because of the mechanics of the tool.

The debris handing mechanism can be developed as a separate component that can be attached to different commercially available shovels. In such an embodiment, a bracket system is used to attach the debris handling mechanism to the shovel. More specifically, the trapping member can be bolted onto a bracket that is fastened to the shovel, instead of bolted directly to the shovel. The pivot point can be the bracket, instead of a bolt through the shovel.

I claim:

1. A debris handling shovel comprising:
   a shovel shaft, a hand grip, a shovel head, a trapping member, and a trigger;
   the hand grip is a D grip having a first end proximate the shovel shaft and a second opposing end;
   the trigger comprises a lever, rod, and a spring;
   the lever of the trigger is a further distance from the shovel head than the first end of the D grip and a shorter distance from the shovel head than the second end of the D grip;
   the shovel head comprising a scoop with a first side wall, second side wall, and bottom wall;
   wherein the rod has a first end and a second end, said first end attached to the lever and proximate the hand grip and said second end proximate the shovel head and attached to said trapping member;
   wherein the rod is adjacent the shovel shaft on the ground side of the shovel;
   wherein said spring is adjacent a connection point between the shovel shaft and shovel head on the ground side of the shovel and has a first end and a second end, said first end attached to the trapping member and said second end attached to the shovel head.

2. The debris handling shovel of claim 1 wherein
   the trapping member is pivotably attached to the shovel shaft by a bolt;
   the trapping member comprises two elongated fingers;
   the elongated fingers of said trapping member comprise a first section and a second section;
   wherein first sections of said fingers extend from the bolt over the shovel head;
   wherein the second sections of said fingers extend from the bolt in the opposite direction as the first sections.

3. A debris handling attachment comprising:
   a trapping member and a trigger;
   the trigger comprises a rod, a lever, and spring;
   the rod has a first end and a second end, said first end attached to the lever and said second end attached to said trapping member;
   the spring has a first end and a second end, said first end of the spring attached to the second end of the rod and the trapping member and said second end of the spring configured to be attached to a tool;
   the trapping member comprising a trapping portion, an opposing counter member, and a bolt configured to pivotally attach the debris handling attachment to said tool;
   the spring is positioned on the opposite side of the shovel shaft as the trapping portion of the trapping member.

4. The debris handling attachment of claim 3 wherein the trapping member comprises two elongated fingers.

5. The debris handling attachment of claim 4 wherein the elongated fingers of said trapping member comprise a first section and a second section;
   wherein first sections of said fingers extend from a bolt over a shovel head;
   wherein the second sections of said fingers extend from the bolt in the opposite direction as the first sections.

\* \* \* \* \*